United States Patent [19]
Mathellier

[11] 3,958,369
[45] May 25, 1976

[54] SEALING STRIPS AND METHODS OF MAKING THEM

[75] Inventor: Lionel J. Mathellier, Chartres, France

[73] Assignee: Draftex, S.A., France

[22] Filed: Dec. 26, 1974

[21] Appl. No.: 536,658

[30] Foreign Application Priority Data
Jan. 9, 1974 France .......................... 74.00660

[52] U.S. Cl. ................................ 49/479; 49/491; 49/498
[51] Int. Cl.² ........................................ E06B 7/16
[58] Field of Search ............. 49/479, 490, 491, 498

[56] References Cited
UNITED STATES PATENTS

| 2,364,962 | 12/1944 | Eagles ........................... 49/479 X |
| 2,571,259 | 10/1951 | Kusiak ........................... 49/479 X |
| 2,794,221 | 6/1957 | Bedics ........................... 49/479 |
| 3,167,825 | 2/1965 | Zoller ........................... 49/490 |
| 3,553,301 | 1/1971 | Readon et al. ................ 49/479 X |
| 3,717,955 | 2/1973 | Urbanick ..................... 49/479 X |

*Primary Examiner*—Philip C. Kannan
*Attorney, Agent, or Firm*—Wolfe, Hubbard, Leydig, Voit & Osann, Ltd.

[57] ABSTRACT

A method is disclosed of adapting a length of sealing strip to suit an acute-angled corner in the frame of a door opening or the like. The sealing strip comprises a longitudinal channel-shaped metal-reinforced gripping portion having a longitudinal soft sealing portion attached along one of its outside walls. The sealing strip is bent to form two lengths which are respectively aligned with the runs of the door frame leading to the acute-angled corner, but with the sealing strip smoothly curved between these two runs so as to part from the door frame at the actual corner. A part of the sealing portion is cut out at the actual corner and replaced with a corner section which is shaped to match the acute angle at the corner and to cover the gap between the sealing strip proper and the corner of the door frame.

12 Claims, 6 Drawing Figures

SEALING STRIPS AND METHODS OF MAKING THEM

BACKGROUND OF THE INVENTION

The invention relates to sealing strips, and more particularly to sealing strips for providing a seal around openings which may, for example, be closable by doors or windows. One exemplary application of such sealing strips is in the construction of vehicle bodies.

Sealing strips are known which comprise a longitudinal gripping portion for supporting the sealing strip in position and a longitudinal sealing portion on and running along the outside of the gripping portion. The gripping portion may, for example, be channel-shaped in cross-section and comprise metal reinforcement covered with flexible covering material. The sealing portion may comprise tubular elastomeric material. Such sealing strips are sufficiently flexible to enable them to follow smooth curves in the profile of a door opening.

However, a problem arises when the door frame to which such a sealing strip is to be attached includes a sharp corner, such as an acute-angled corner for example, since it is not possible to bend the sealing strip sufficiently sharply to match the corner, and it will part from the door frame at the corner leaving a gap which is imperfect both from an appearance and a sealing point of view.

In order to deal with this problem, it is known to cut a sealing strip into two lengths and then to shape the two cut ends suitably and to attach them together to form a mitered butt joint to match the corner in the door frame. This procedure however is not entirely satisfactory. It is time-consuming and therefore unsatisfactory for mass production purposes. Furthermore, inevitably it weakens the support of the gripping portion at the actual corner. If the gripping section is metal-reinforced then the cutting operation may involve cutting through the metal reinforcement.

An object of the invention is to provide an improved method of forming a corner in a length of sealing strip.

Another object of the invention is to provide an improved sealing strip adapted to fit a corner.

BRIEF SUMMARY OF THE INVENTION

According to the invention, there is provided a method of forming a corner in a length of sealing strip having a longitudinal gripping portion for supporting the sealing strip in position and a longitudinal sealing portion on and running alongside the gripping portion, comprising the steps of bending the sealing strip to produce two lengths rspectively aligned with the directions leading to the said corner, cutting away at least part of the sealing portion between the two said lengths of the sealing strip, and attaching into the cut-out so formed in the sealing portion, a corner section shaped to match the angle at said corner.

According to the invention, there is also provided a method of forming a sharp corner in a length of sealing strip having a longitudinal gripping portion for supporting the sealing strip in position and a longitudinal sealing portion on and running alongside the gripping portion, comprising the steps of smoothly bending the sealing strip to follow the general change in direction formed by the said corner but to part from the angle at the corner, cutting away at least part of the sealing portion at the actual corner, and replacing the cut-away part of the sealing portion by a corner section having a profile shaped to match the angle of the corner.

According to the invention, there is further provided a sealing strip for attachment into a corner of predetermined, sharp angle, comprising a longitudinal gripping portion for supporting the sealing strip in position, a longitudinal sealing portion on and running alongside the gripping portion, the sealing strip being bent to follow the change in direction produced by the said corner but parting from the angle at the corner, and a corner section fixed into a cut-out in the sealing portion at the corner, the corner section having a profile which matches the angle at the said corner.

BRIEF DESCRIPTION OF THE DRAWINGS

A sealing strip embodying the invention, and a method according to the invention of making a sealing strip, will now be described, by way of example only, with reference to the accompanying drawings in which.

DESCRIPTION OF PREFERRED EMBODIMENTS

The sealing strip now to be described is for attachment around the frame of the door opening in a vehicle body. It is designed to clamp over the metal flange of the door opening and to carry a seal against which the vehicle door closes. Vehicle door openings may include a sharp corner where two frame portions meet at a point, or in a tight curve of small radius, to define a sharp angle between them, may be of less than 90°. The sealing strip to be described provides a seal at such a corner.

Figure 1:
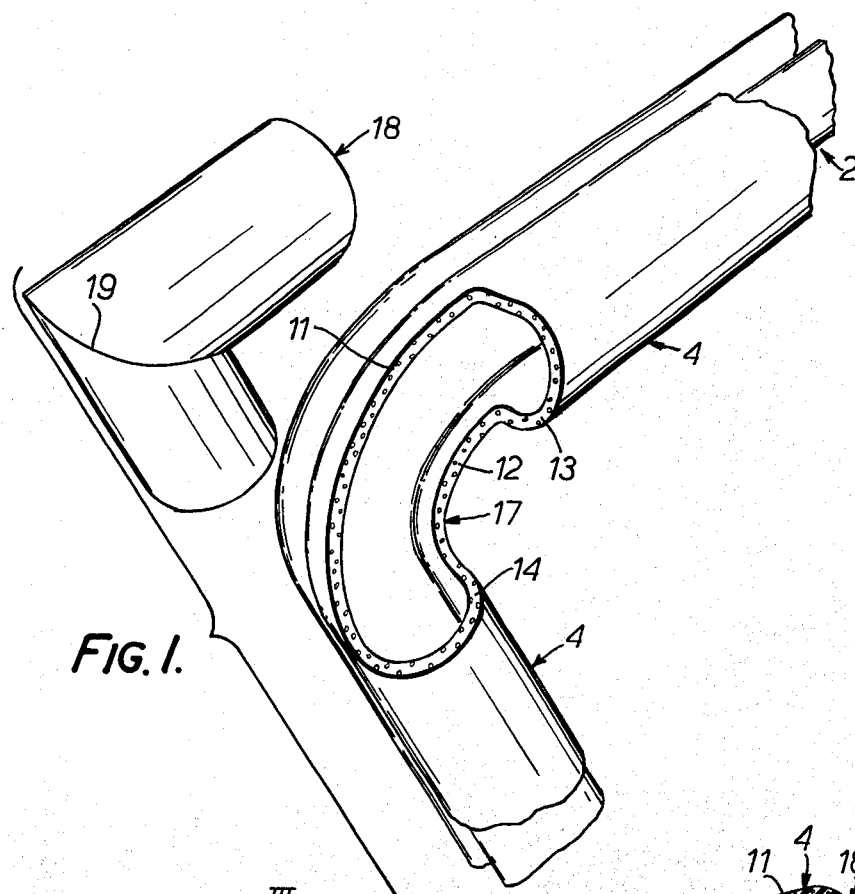
FIG. 1 is an exploded perspective view of the sealing strip during manufacture.
Figure 3:
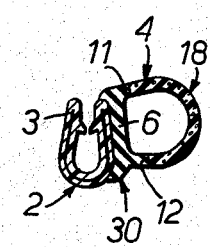
FIG. 3 is a section on the line III—III of FIG. 2.

As shown in FIG. 1, the sealing strip comprises a gripping portion 2 and a sealing portion 4. The gripping portion 2, which is shown in section in FIG. 3, comprises an extrusion of plastics material of generally channel-shaped form, completely covering a metal carrier member 3, also of channel-shaped form. The metal carrier member 3 may comprise a series of U-shaped elements arranged side by side along the length of the gripping section 2 and either connected by short flexible links or entirely disconnected. Other forms of carrier member are also possible. Whatever the form of carrier member used, however, it is designed so that the gripping portion 2 has reasonable flexibility. As shown in FIG. 3, the inside facing walls of the plastic material of the gripping portion 2 are provided with longitudinally running gripping ribs.

The sealing portion 4 is made of an elastomeric material, such as cellular rubber, and is of hollow tubular form. It has a base 6 which is adhesively secured to the outside of one wall of the gripping portion 2.

In use, the sealing strip described is fitted onto the door frame in the vehicle body by placing the gripping portion 2 onto the metal flange 5 (see FIG. 2) which surrounds the door frame, so that the open mouth of the channel of the gripping portion 2 faces outwardly of the door opening. The gripping portion 2 thus supports the sealing portion 4 around the door opening, and in use the door closes onto the sealing portion 4 to provide an air and weather-tight seal.

Figure 2:
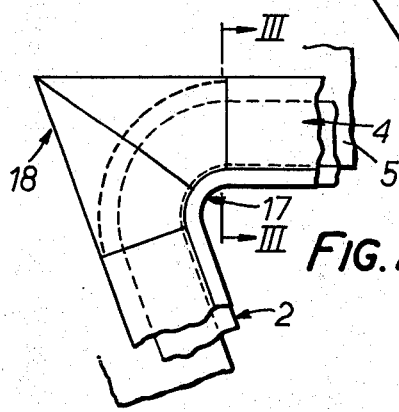
FIG. 2 is a side elevation of part of the sealing strip ready to be fitted on to a door flange.

It will be appreciated that it is essential to provide a continuous seal around the corners of the door opening. If the corners are smoothly rounded, then the gripping portion 2 can be bent to follow the curvature of the corner and no difficulty arises. If, however, the corner is sharp (and in practice the included angle at a corner in a door opening may be 90° or even less), than it is not possible to bend the gripping portion 2 sufficiently sharply. FIGS. 1 to 3 show how the sealing strip being described is arranged to provide a proper seal around such a sharp corner.

As shown in FIG. 1, the gripping portion 2 is given a curve so as to align two lengths of the gripping portion with the lengths of the door frame on either side of the corner to be accommodated. However, no attempt is made to bend the gripping portion 2 sufficiently tightly to fit the corner.

In addition, a section is sliced out from the sealing portion 4 at the corner so as to produce a cut-out opening 17 therein which is bounded by two lips 11, 12, which remain parallel to the corresponding curved lines of the gripping portion 2 and two further lips 13 and 14 matching the cross-section of the sealing portion 4. The removal of the cut-out section of the sealing portion 4 prevents kinking or undue stretching occurring in the sealing portion 4 at the corner.

A separate corner section 18 is then fitted into place in the cut-out 17. As shown in FIG. 2, the corner section 18 is formed so as to have a configuration which exactly matches the sharp corners in the door frame flange 5. When the sealing strip is placed into position on the door flange 5, the corner section 18 thus covers the inevitable gap between the door frame flange 5 and the gripping section 2 at the corner. A neat external appearance is therefore preserved as well as a complete seal all around the door opening. The corner section 18 may be made of the same material as the sealing portion 4 and is fitted into position by welding, glueing or vulcanising to the lips 11, 12, 13 and 14 of the sealing portion 4 so that the joints between them remain substantially undetectable. Advantageously, the corner section 18 is hollow, but it may instead be solid. It may be shaped as indicated in FIG. 1 so as to provide two part-cylindrical surfaces, which respectively match the external surfaces of the two lengths of the sealing portion 4 meeting at the corner, the two part-cylindrical surfaces of the corner section 18 meeting along a line 19. Instead, however, it may be shaped so that the two part-cylindrical surfaces merge together without there being a definite join line between them.

The cut-out 17 (FIG. 1) may be modified by cutting more or less deeply into the sealing portion 4 than illustrated in FIG. 1. For example, the cut may be taken more deeply, and down as far as the surface of the gripping portion 2, so as completely to remove the base 6 of the sealing portion at the corner.

The corner section 18 can be manufactured in any suitable way, such as by moulding. It may, for example, be moulded directly onto the relevant lengths of the sealing portion 4 by placing the sealing strip, after forming the cut-out 17, into a mould. The mould has a moulding cavity shaped to the desired profile of the corner section 18, and also has guides leading into the cavity at suitable angles which hold the two lengths of the sealing strip, on either side of the cut-out 17, at the correct attitudes. The mould cavity is then filled by any suitable method, such as by pouring, simple filling or injection under pressure, of elastomeric material in suitably molten form. The material cures to form the corner section 18 and becomes secured to the lips 11, 12, 13 and 14 of the cut-out 17. During such a moulding process, a suitably shaped mould core may be used.

If the elastomeric material used in the moulding process described above is of suitable type, then the moulding process may be accompanied by expansion of the cells of the material to provide a soft and spongy texture.

It will be appreciated that the use of the corner section 18, to provide a neat and effective seal at a sharp corner of a door frame, is advantageous as compared with a method where a sharp corner is accommodated by forming a mitred butt joint between two entirely separate lengths of sealing strip. Such a mitred butt joint necessitates cutting completely through the sealing strip, that is, not only through the sealing portion 4 but also through the gripping portion 2. It is then necessary to ensure that the ends are at the correct mutual angles, and finally they have to be stuck or welded together. The result may be a corner joint which is imperfect as regards appearance and sealing effectiveness. Furthermore, the corner so produced is weak from a mechanical point of view because the support provided by the metal carrier 3 at the actual corner joint is missing.

It will be appreciated that the corner section 18 can be designed to cope with corners of almost any radius and will hide any creasing, stretching or kinking which may take place in the lips 11 and 12.

Figure 4:
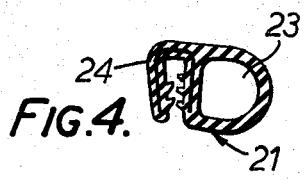
FIG. 4, 5 and 6 are cross-sections through modified forms of the sealing strip of FIGS. 1 to 3.
Figure 5:
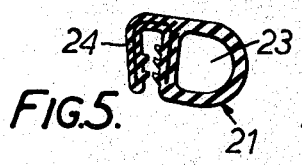

It will be appreciated that separate corner sections, corresponding to the corner section 18, may be used with sealing strips of many different configurations and construction. FIGS. 4 and 5, for example, show cross-sections through sealing strips 21 in which the same soft flexible material is used both for the sealing section 23 and for the gripping section 24. This material may, for example, be an elastomer, and in each case it will be noted that a metal carrier member, corresponding to the carrier member 3 of FIGS. 1 to 3, is provided. In FIG. 5, the elastomeric material used is arranged such that it is cellular in form in the sealing portion 23 but not in the gripping portion 24.

Figure 6:

FIG. 6 shows a sealing strip in which the covering material (plastics material, for example) of the gripping portion is different from that of the sealing portion (this may be an elastomeric material for example). The construction is thus similar in some respects to that shown in FIGS. 1 to 3, but the sealing portion 34 in FIG. 6 is not tubular in cross-section but provides a longitudinally extending curved lip. Again, it will be appreciated that a sharp corner in such a sealing strip can be accommodated by cutting away all or part of the sealing portion 34 at the corner and then fitting in a separate corner section corresponding to the section 18 of FIGS. 1 to 3.

It will be appreciated that the sealing strips described, and the methods described for forming sharp corners therein, are not restricted to use for door openings in vehicle bodies but may be used in any other appropriate application.

What is claimed is:

1. A method of forming a length of sealing strip to match a sharp corner, the sealing strip having a longitudinal channel-shaped gripping portion, in which is embedded a channel-shaped metal reinforcement, for supporting the sealing strip in position on a mounting edge and a longitudinal sealing portion attached on one outside wall of, and running alongside the, gripping portion, said method comprising the steps of smoothly bending the two portions of the sealing strip together to produce two lengths of the strip respectively aligned with the directions leading to the said corner and an intermediate length in which the two portions of the sealing strip bridge across the sharp angle of the corner, cutting away at least part of the sealing portion in the said intermediate length of the sealing strip but leaving the gripping portion completely uncut, and attaching into the cut-out so formed in the sealing portion, a corner section having an outer profile shaped to match the sharp angle at said corner.

2. A method according to claim 1, wherein the said corner section is produced by a molding operation in which the sealing strip, having the said cut-out formed in it and having been bent to provide the said two aligned lengths, is held in situ in the mold.

3. A method according to claim 1, in which the step of cutting away the sealing portion in the said intermediate length of the sealing strip completely removes the sealing portion in the said intermediate length.

4. A method according to claim 1, in which the step of cutting away the sealing portion in said intermediate length of the sealing strip leaves, attached to the gripping portion, and extending between the two said lengths of the sealing strip, a base part of the sealing portion.

5. A method according to claim 1, in which the gripping portion and the sealing portion are separately formed and then attached together.

6. A method according to claim 1, in which the gripping portion and the sealing portion are formed integrally.

7. A sealing strip for attachment into a corner of predetermined, sharp, angle, comprising a longitudinal channel-shaped gripping portion for supporting the sealing strip in position on a mounting edge and having embedded channel-shaped metal reinforcement, a longitudinal sealing portion attached on one outside wall of, and running alongside the, gripping portion, both portions of the sealing strip being bent to follow the change in direction produced by the said corner but parting from the sharp angle at the corner so that the gripping portion, at least, bridges across the sharp angle at the corner, and a corner section fixed into a cut-out of the sealing portion of the corner and supported on the gripping portion where it bridges across the sharp angle of the corner, the corner section having an outer profile which matches the angle at the said corner.

8. A sealing strip according to claim 7, in which the sealing portion is manufactured separately from, but fixed to, the outside of the gripping portion.

9. A sealing strip according to claim 7, in which the external material of the gripping portion is integral with the material of the sealing portion.

10. A sealing strip according to claim 7, in which the sealing portion has a hollow profile.

11. A sealing strip according to claim 7, in which the corner section is hollow.

12. A sealing section according to claim 7, in which the corner section is solid.

* * * * *